(12) United States Patent
Sim et al.

(10) Patent No.: US 6,785,212 B1
(45) Date of Patent: Aug. 31, 2004

(54) OPTICAL DISK REPRODUCING APPARATUS HAVING A VITERBI DETECTOR

(75) Inventors: Tae-hyeon Sim, Seoul (KR); Il-kwon Kim, Yongin (KR); Soo-woong Lee, Yongin (KR)

(73) Assignee: Samsung Electronics Co., Ltd. (KR)

( * ) Notice: Subject to any disclaimer, the term of this patent is extended or adjusted under 35 U.S.C. 154(b) by 776 days.

(21) Appl. No.: 09/628,834

(22) Filed: Jul. 31, 2000

(30) Foreign Application Priority Data

Nov. 10, 1999 (KR) ........................................ 1999-49721

(51) Int. Cl.[7] .............................................. G11B 7/005
(52) U.S. Cl. .................... 369/59.22; 375/340; 375/341; 714/795; 714/796
(58) Field of Search ................................ 375/340, 341; 714/794, 795, 796; 396/59.22

(56) References Cited

U.S. PATENT DOCUMENTS

| 5,684,773 | A |   | 11/1997 | Hayashi | .......................... 369/59 |
| 5,901,128 | A | * | 5/1999 | Hayashi et al. | .......... 369/59.22 |
| 6,070,263 | A | * | 5/2000 | Tsui et al. | ................... 714/795 |
| 6,111,835 | A | * | 8/2000 | Honma | ..................... 369/59.13 |
| 6,249,553 | B1 | * | 6/2001 | Honma | ......................... 375/341 |
| 6,614,841 | B1 | * | 9/2003 | Ohta | ........................... 375/232 |

* cited by examiner

Primary Examiner—W. R. Young
Assistant Examiner—M. V. Battglia
(74) Attorney, Agent, or Firm—Mills & Onello, LLP

(57) ABSTRACT

An optical disc reproducing apparatus including a viterbi detector for an optical disc in which digital data is stored includes an optical pick-up for reading digital data stored in the optical disc and for generating a high frequency signal, an analog-to-digital converter for sampling and quantizing the high frequency signal, and a viterbi detector for decoding a quantized signal output from the analog-to digital converter and reproducing an eight to fourteen modulation (EFM)/EFM+signal. The viterbi detector includes a branch metric calculator for receiving a signal constituted of n bits, for comparing the signal with previously set three variables, and for calculating a branch metric with respect to the input signal. A path metric update and storage unit receives the branch metric, adds the branch metric to values stored therein, compares the error content of all the possible paths with each other, and stores a metric with respect to the path having the smallest amount of errors. A path memory receives the output signal of the path metric update and storage unit and generates a viterbi decoded recovery signal. A stable eight to fourteen modulation (EFM)/EFM+signal is reproduced.

13 Claims, 4 Drawing Sheets

OPTICAL DISK REPRODUCING APPARATUS HAVING A VITERBI DETECTOR

BACKGROUND OF THE INVENTION

1. Field of the Invention

The present invention relates to an optical disc reproducing apparatus, and more particularly, to an optical disc reproducing apparatus for reproducing an eight to fourteen modulation ((EFM)/EFM+) signal using a viterbi detector.

2. Description of the Related Art

As multimedia technology, including audio and video technologies, and related data compression technology, continue to rapidly develop, recording media for supporting these technologies continues to evolve. Key requirements for new recording media include an ability to transmit high-speed data and a large storage capacity. As the successor to the magnetic tape, the popular compact disc and video compact disc are capable of storing approximately 600 Mbytes of audio and video data in an optical disc format of a diameter of 12 cm. Recently, digital video discs, a digital video disc ROMs, and digital video disc RAMs have been produced that are capable of storing multimedia data or programs of 4.7 Gbytes in an optical disc of 12 cm diameter. For the compact disc, data is stored following modulation of 8-bit data to 14-bit data using the popular EFM method. For the digital video disc, data is stored after modulating the 8-bit data to 16-bit data using the popular EFM+method.

The system for reproducing data stored in an optical disc is commonly referred to in the art, and herein, as an optical disc reproducing apparatus.

FIG. 1 shows a portion of a conventional optical disc reproducing apparatus. Referring to FIG. 1, the conventional optical disc reproducing apparatus includes a current-to-voltage converter 111, an automatic gain controller 121, an analog equalizer 131, and a slice circuit 141. Combined, the components reproduce an EFM/EFM+ signal. A high frequency signal stored on an optical disc (not shown), is read by an optical pick-up (not shown), and is converted into a high frequency signal with respect to a voltage by the current-to-voltage converter 111. Any distorted portions of the signal output from the current-to-voltage converter 111 are compensated for by an optical characteristic in the automatic gain controller 121. The signal output by the automatic gain controller 121 is input to the slice circuit 141 through an analog equalizer 131 and the resulting EFM/EFM+ signal is generated by the slice circuit 141.

In the conventional optical disc reproducing apparatus described above, various errors are generated during reproduction of the EFM/EFM+ signal by interference between signals when the manufacturing state of a disc is poor or unreliable, when a disc is recorded in high density, or when the operation speed of the optical disc reproducing apparatus increases.

According to U.S. Pat. No. 5,684,773, a viterbi decoder is employed for a digital data information reproducing apparatus. However, since the difference metric of a signal SP(k) input to a branch-metric operator is obtained by the branch-metric operator included in the viterbi detector using five variables y(ak), the calculation method becomes complicated in branch-metric operating. Accordingly, the structure of the circuit of the viterbi detector becomes complicated and cumbersome.

SUMMARY OF THE INVENTION

To address the aforementioned limitations, it is an object of the present invention to provide a viterbi detector that reproduces a stable eight to fourteen modulation (EFM)/EFM+ signal.

It is another object of the present invention to provide an optical disc reproducing apparatus including such a viterbi detector.

To achieve the first object, there is provided a viterbi detector, comprising a branch metric calculator for receiving a signal constituted of n bits, comparing the signal with previously set three variables, and calculating a branch metric with respect to the input signal, a path metric update and storage unit for receiving the branch metric, adding the branch metric to values stored therein, comparing all the possible paths with each other, and storing a metric with respect to the path having the smallest amount of errors, and a path memory for receiving the output signal of the path metric update and storage unit and generating a viterbi decoded recovery signal.

The branch metric calculator preferably comprises a difference metric calculator for comparing the input signal with the three variables, obtaining the differences between the input signal and the three variables, and for generating three difference metrics, and a branch metric selector for generating a plurality of branch metrics by comparing the difference metrics with each other.

The variables are preferably constituted of a reference value, a limit value obtained by adding a predetermined difference value to the reference value, and a low limit value obtained by subtracting the predetermined difference value from the reference value and the reference value is obtained by $2^{n-1}$. The variables are previously set.

To achieve the second object, there is provided an optical disc reproducing. apparatus for an optical disc in which digital data is stored, comprising an optical pick-up for reading digital data stored in the optical disc and generating a high frequency signal, an analog-to-digital converter for sampling and quantizing the high frequency signal, and a viterbi detector for decoding a quantized signal output from the analog-to digital converter and reproducing an eight to fourteen modulation (EFM)/EFM+ signal, wherein the viterbi detector comprises a branch metric calculator for receiving a signal constituted of n bits, comparing the signal with previously set three variables, and calculating a branch metric with respect to the input signal, a path metric update and storage unit for receiving the branch metric, adding the branch metric to values stored therein, comparing all the possible paths with each other, and storing a metric with respect to the path having the smallest amount of errors, and a path memory for receiving the output signal of the path metric update and storage unit and generating a viterbi decoded recovery signal.

The optical disc reproducing apparatus preferably further comprises an adaptive equalizer for compensating for the distorted high frequency component of the output signal of the analog-to-digital converter and transmitting the compensated high frequency component to the viterbi detector.

The EFM/EFM+ signal is stably reproduced by the optical disc reproducing apparatus according to the present invention.

BRIEF DESCRIPTION OF THE DRAWING(S)

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENT(S)

Figure 1:
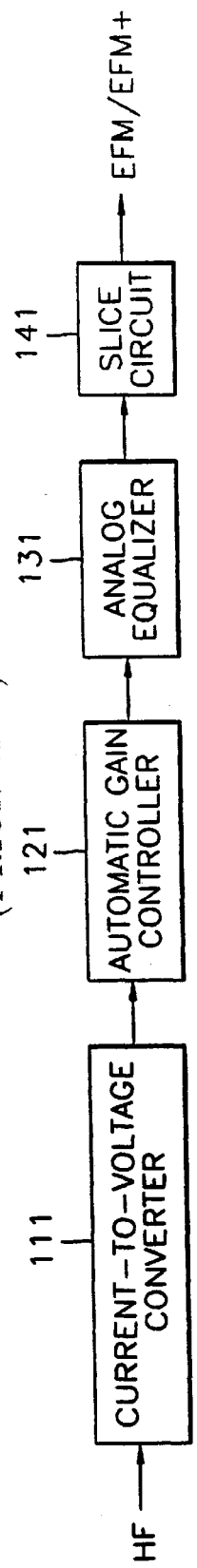
FIG. 1 is a block diagram of a portion of a conventional optical disc reproducing apparatus for reproducing an EFM (eight to fourteen modulation)/EFM+ signal.
Figure 2:
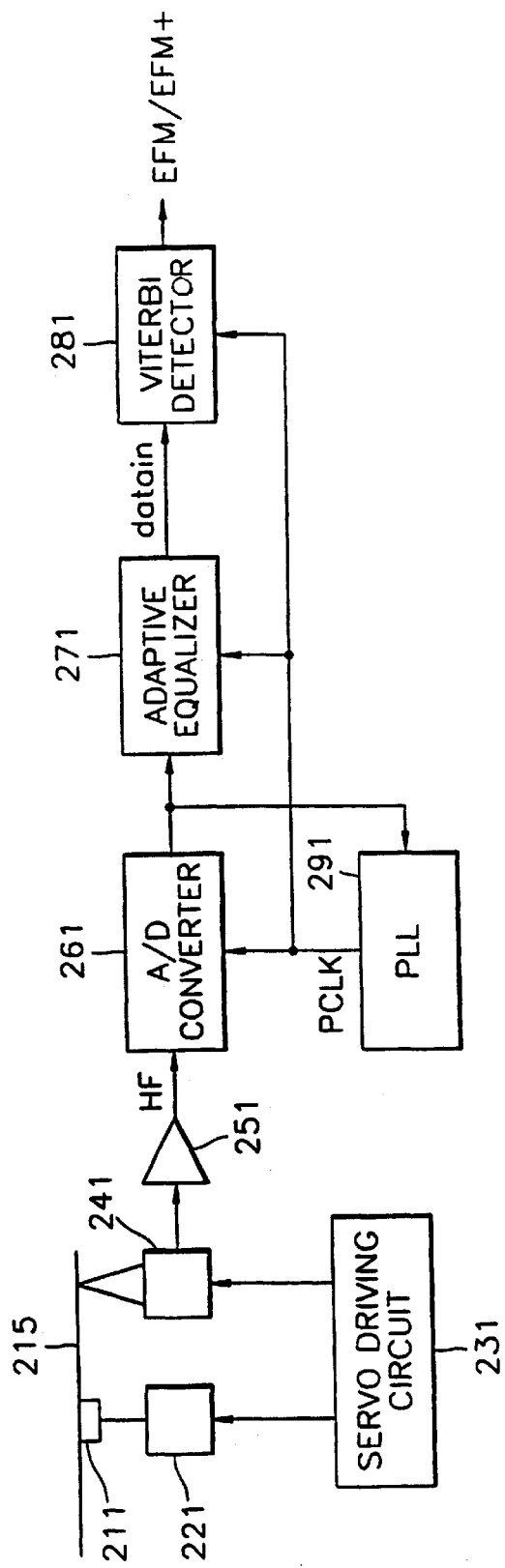
FIG. 2 is a block diagram showing an optical disc reproducing apparatus according to an embodiment of the present invention for reproducing the EFM/EFM+ signal.

FIG. 2 is a block diagram showing an optical disc reproducing apparatus according to an embodiment of the present invention, for reproducing an eight to fourteen modulation (EFM)/EFM+ signal. Referring to FIG. 2, the optical disc reproducing apparatus includes a turn-table 211, a spindle driving motor 2211, a servo circuit 231, an optical pick-up 241, an amplifier 251, an analog-to-digital converter 261, an adaptive equalizer 271, a viterbi detector 281, and a phase locked loop (PLL) 291.

An optical disc 215, such as a compact disc or a digital video disc, is provided on the turn-table 211. Digital data is pre-recorded on the optical disc 215. The turn-table 211 rotates the optical disc 215, and is driven by the spindle driving motor 221. During rotation, the optical pick-up 241 reads digital data recorded on the optical disc 215 by emitting an optical signal to the surface of the optical disc 215. The servo circuit 231 controls operation of both the spindle driving motor 221 and the optical pick-up 241. The amplifier 251 amplifies the high frequency signal output from the optical pick-up 241 and transmits the amplified signal to the analog-to-digital converter 261. The PLL 291 generates a clock signal PCLK for controlling and synchronizing the analog-to-digital converter 261, the adaptive equalizer 271, and the viterbi detector 281.

The analog-to-digital converter 261 samples and quantizes the high frequency signal (HF) synchronized with the clock signal PCLK and input thereto. The sampling timing is determined by the clock signal PCLK. The analog-to-digital converter 261 quantizes the high frequency signal to, for example, less than or equal to 8 voltage levels. This is because the signal quantizing characteristics are not significantly improved no matter how superior the performance of the analog-to-digital converter 261, when the quantization is performed to greater than 8 levels. During quantization, processing time consumed by sampling the high frequency signal HF is in units of several decades of MHz, which is very short. Therefore, an analog-to-digital converter 261 of low power consumption can be employed.

The adaptive equalizer 271 compensates for the digital signal output from the analog-to-digital converter 261 in synchronization with the clock signal PCLK. Namely, the adaptive equalizer 271 compensates for the distorted high frequency component of the high frequency signal HF input to the analog-to-digital converter 261, caused by high density data recording and rapid rotation of the optical disc 215. The signal input to the adaptive equalizer 271 is constituted of n bits. When the signal is input to the adaptive equalizer 271, the high frequency component is amplified and the distorted signal is recovered according to the known or estimated characteristics of the optical channel. Accordingly, an inter-symbolic interference component is reduced.

The viterbi detector 281 receives the output signal of the adaptive equalizer 271 and reproduces a stable EFM/EFM+ signal in synchronization with the clock signal PCLK. When the optical disc 215 is the compact disc, the viterbi detector 281 reproduces the EFM signal. When the optical disc 215 is the digital video disc, the viterbi detector 281 reproduces the EFM+ signal. The viterbi detector 281, which is a maximum likelihood estimator, detects a path having the optimal, for example maximum, value. Since the viterbi detector 281 does not allow decoding to be delayed for a long time and since the signal is serially input to the viterbi detector 281, the viterbi detector 281 is synchronized with the clock signal PCLK so as to sense the head of a data block.

The signal input to the viterbi detector 281 is preferably constituted of n bits and, for example, comprises an offset binary number. The signal input to the viterbi detector 281 can be the complement of the binary number and the offset binary number. However, since a multiplication is not required for the viterbi detector 281, the offset binary number is advantageous.

Figure 3:
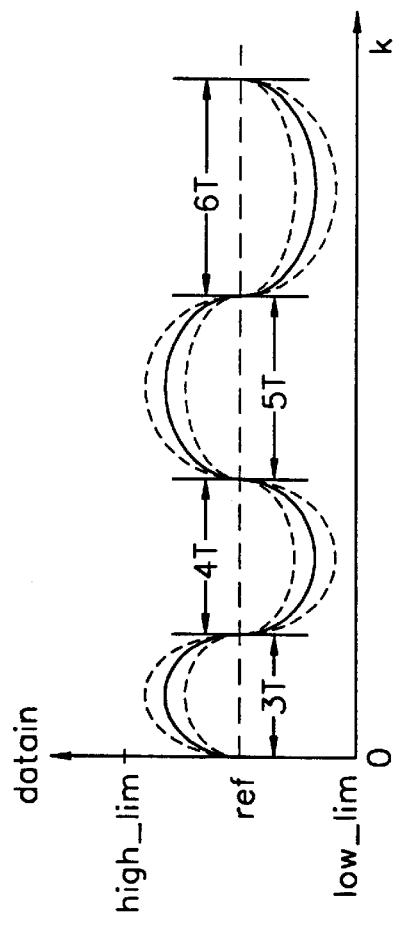
FIG. 3 is a waveform diagram showing a signal input to the viterbi detector shown in FIG. 2, in accordance with the present invention.

FIG. 3 shows the signal input to the viterbi detector 281. In FIG. 3, a solid line denotes a normal input signal and dashed lines denote input signals ranging upward and downward of the normal signal. The signal input to the viterbi detector 281 is preferably modulated in the form of a non return to zero (NRZ), encoded in an RLL(2, 10) method, and preferably quantized to a predetermined bit, for example, 6 bits. The signal is preferably of a period continuously equal to or greater than 3T and equal to or less than 10T, which is larger or smaller than a reference value (ref).

Figure 4:
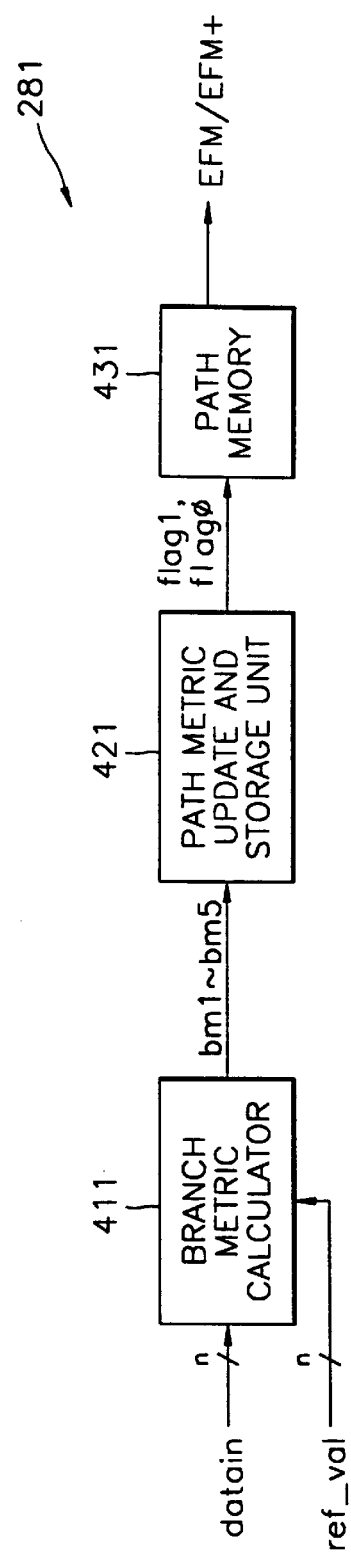
FIG. 4 is a block diagram of the viterbi detector shown in FIG. 2.

FIG. 4 is a block diagram of the viterbi detector 281 shown in FIG. 2. Referring to FIG. 4, the viterbi detector 281 includes a branch metric calculator 411, a path metric update and storage unit 421, and a path memory 431.

The branch metric calculator 411 calculates a branch metric with respect to an input signal (datain). The branch metric calculator 411 preferably has a look-up table structure having various bit metrics. The branch metric calculator 411 obtains n bit-metrics from the combination of each branch and adds the n bit-metrics to each other in order to obtain the branch metric. When channels are symmetric with each other, the branch metric calculator 411 can be realized in a simple configuration. Namely, the memory size required when the channels are symmetric with each other is half of the memory size required when the channels are asymmetric with each other.

Figure 5:
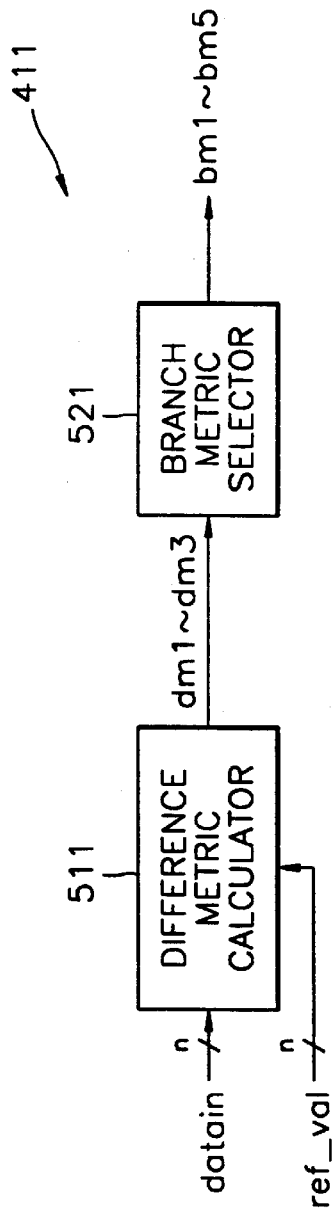
FIG. 5 is a block diagram of the branch metric calculator shown in FIG. 4.
Figure 6:
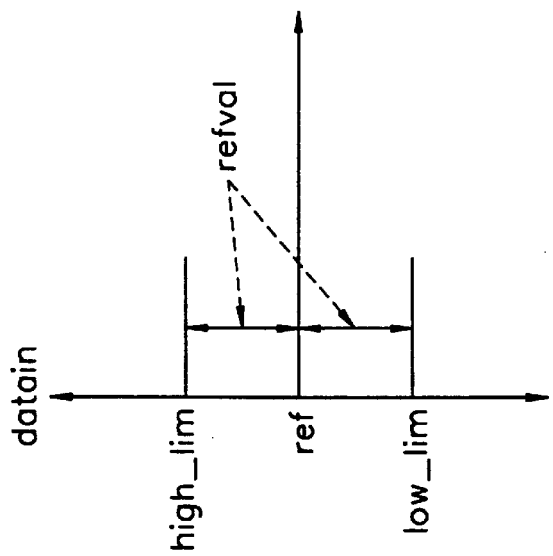
FIG. 6 is a chart describing a method for obtaining a difference metric by the difference metric calculator shown in FIG. 4.

The branch metric calculator 411 preferably comprises a difference metric calculator 511 and a branch metric selector 521 as shown in FIG. 5. The difference metric calculator 511 preferably obtains the difference between the input signal (datain) and previously set values as shown in FIG. 6. The reference value (ref) is determined by the number of bits to which the high frequency signal HF input to the analog-to-digital converter 261 is quantized. A difference value (ref_val) for determining a high limit value and a low limit value can be obtained by the following Equation 1.

$$\text{ref\_val} > 2^{n-1} \times (2/3) \qquad (1)$$

The difference value (ref_val) is preferably automatically calculated b being input through a micro controller (not shown).

The difference metric calculator 511 outputs difference metrics dm1, dm2, and dm3. An algorithm for obtaining the difference metrics dm1, dm2, and dm3 is shown in Equation 2.

$$\text{high\_lim}=2^{n-1}+\text{ref\_val},$$
$$\text{low\_lim}=2^{n-1}-\text{ref\_val},$$
$$dm1=|\text{datain-high\_lim}|,$$
$$dm2=|\text{datain-ref}|,$$
$$dm3=|\text{datain-low\_lim}| \quad (2)$$

wherein, the input signal (datain) is constituted of n bits.

The branch metric selector 521 receives the difference metrics dm1, dm2, and dm3 and generates the branch metrics bm1 through bm5. An example of a process for obtaining the branch metrics bm1 through bm5 is shown in Equation 3.

if dm1<dm2<dm3, bm1=low_low, bm2=low_mid, bm3=mid, bm4=high_mid, bm5=high_high, if dm1>dm2>dm3, b1=high_high, bm2=high_mid, bm3=mid, bm4=low_mid, bm5=low_low, in other cases, bm1=mid, bm2=low_mid, bm3=low_low, bm4=low_mid, bm5=mid wherein, high_high>high_mid>mid>low_mid>low_low.

Uniform set values can be obtained as various branch metrics after obtaining the difference metrics. This is because the signal (datain) input to the viterbi detector 281 can be symmetrical with respect to the reference value (ref) as shown in the solid line of FIG. 3, however, can be asymmetrical with respect to the reference value (ref) since the signal (datain) is inclined upward and downward to some degree as denoted by the dashed lines. If the signal (datain) is continuously input to be asymmetrical with respect to the reference value (ref), errors due to the asymmetrical component are accumulated. Accordingly, the viterbi detector 281 may misfunction. The branch metrics are determined by previously set values and are stored in the branch metric update and storage unit 421.

Returning to FIG. 4, the branch metric calculator 411 compares the input signal (datain) with three previously set variables (ref, high_lim, and low_lim) and calculates the differences between the input signal (datain) and the three variables (ref, high_lim, and low_lim). Accordingly, the calculation the difference metrics is relatively straightforward. Therefore, the metric calculator 411 can be realized in a relatively simple configuration. Additionally, the upward and downward asymmetrical components of the signal (datain) input to the branch metric calculator 411 are removed.

The path metric update and storage unit 421 receives the branch metrics, that is, the output signals bm1 through bm5 of the branch metric calculator 411, adds the branch metrics to the values stored in the path metric update and storage unit 421, and stores the path metric having the smallest amount of errors. The selected path is generated as flag signals flag1 and flag0 and the flag signals flag1 and flag0 are transmitted to a path memory.

The path metric is preferably calculated using an add-compare-select (ACS) structure. In the ACS structure, a probability distance is calculated using the branch metrics calculated by the branch metric calculator 411. The state value predicted by the calculated probability distance is transmitted to and stored in the path memory 431. The path metric update and storage unit 421 requires six register banks since the digital video disc system is recorded in an RLL(2,10) method. Since the result of calculating the path metric can continuously increase, the over flow of the set register bank is prevented by comparing the values stored in register banks with each other.

Figure 7:
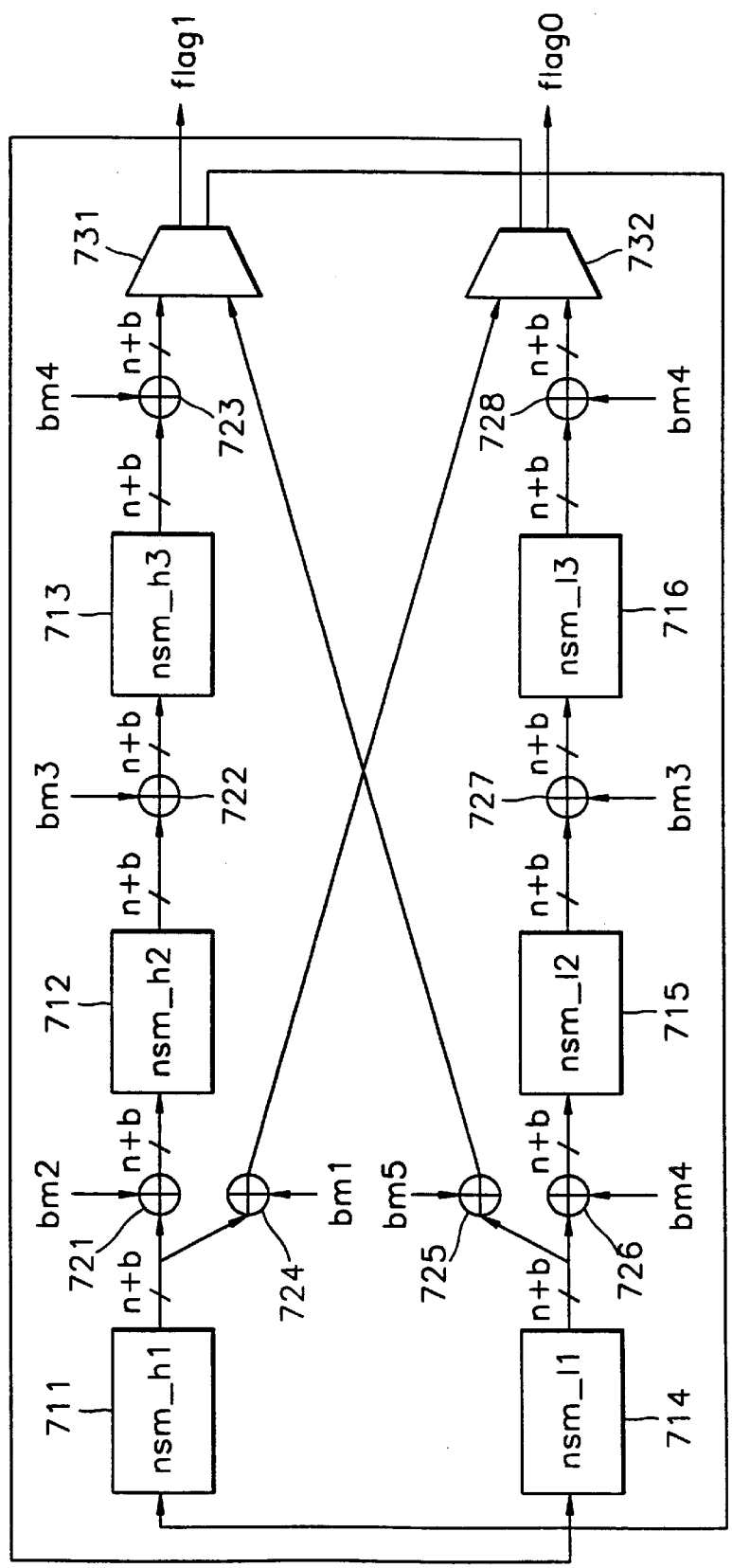
FIG. 7 is a detailed block diagram of the path metric update and storage unit shown in FIG. 4.

FIG. 7 is a detailed block diagram of a preferred embodiment of the metric update and storage unit 421 shown in FIG. 3. Referring to FIG. 7, the path metric update and storage unit 421 includes register banks 711 through 716, adders 721 through 728, and comparators 731 and 732. The output signals bm1 through bm5 of the branch metric calculator 411 are added to the path metrics nsm_hi through nsm_h3 and nsm_l1 through nsm_l3 stored in the register banks 711 through 716. The calculation performed by the path metric storage and updated unit is represented by Equation 4:

$$up1=nsm\_h1+bm1;$$
$$low1=nsm\_l3+bm2;$$
$$up0=nsm\_l1+bm5;$$
$$low0=nsm\_h3+bm4;$$
$$nsm\_h2=nsm\_h1+bm2;$$
$$nsm\_h3=nsm\_h2+bm3;$$
$$nsm\_l2=nsm\_l1+bm4;$$
$$nsm\_l3=l2+bm3; \quad (4)$$

The probability distance is determined by comparing the path metrics up1, low1, Up0, and low0 calculated by Equation 4 with each other. The comparison and the determination are performed as shown in Equation 5:

if up1<low1, nsm_h1=up1, flag1=1, if not, nsm_h1=low1, flag1=0.

if up0<low0, nsm_l1=up0, flag0=0, if not, nsm_l1=law0, flag0=1. (5)

The data nsm_h1 and nsm_l1 are stored in the register banks 711 through 716 according to the comparison of Equation 5. The flag signals flag1 and flag2 are transmitted to the path memory 431 (see FIG. 4). In the embodiment of FIG. 7, b is preferably larger than 3.

The path memory 431 preferably has six states due to the characteristics of the EFM/EFM+ signal. In the path memory 431, m registers (not shown) are used for each storage bank having such a characteristic. The EFM/EFM+ signal in which viterbi decoding is stabilized is output from the path memory 431.

As mentioned above, according to the optical disc reproducing apparatus according to the present invention, it is possible to stably reproduce the EFM/EFM+ signal using the viterbi detector 281. In particular, since the branch metric calculator 411 of the viterbi detector 281 compares the input signal (datain) with the three variables (ref, high_lim, and low_lim), it is possible to realize the branch metric calculator 411 in a relatively simple configuration, and further possible to simplify the calculation of the difference metric. Additionally, the upward and downward asymmetry components of the signal (datain) input to the branch metric calculator 411 are removed.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A viterbi detector, comprising:
a branch metric calculator for receiving an input signal comprising n bits comprising:
a difference metric calculator for comparing the input signal with three predetermined variables, for obtaining the differences between the input signal and the three variables, and for generating three difference metrics, and
a branch metric selector for generating a plurality of branch metrics by comparing the difference metrics with each other;
a path metric update and storage unit for receiving the plurality of branch metrics, for adding the branch metrics to values stored therein, for comparing the error content of all the possible paths with each other, and for storing a metric with respect to the path having the smallest amount of error content; and
a path memory for receiving the output signal of the path metric update and storage unit and for generating a viterbi-decoded recovery signal.

2. The viterbi detector of claim 1, wherein the variables comprise a reference value, a high limit value obtained by adding a predetermined difference value to the reference value, and a low limit value obtained by subtracting the predetermined difference value from the reference value and the reference value is represented by $2^{n-1}$, where n is the number of bits in the signal.

3. The viterbi detector of claim 2, wherein the variables are previously set.

4. The viterbi detector of claim 1 wherein the branch metric selector generates the plurality of branch metrics by comparing respective values of the difference metrics with each other, and assigns values to the plurality of branch metrics based on a result of the comparison.

5. The viterbi detector of claim 1 wherein the plurality of branch metrics generated by the branch metric selector are of a number that is greater than the number of difference metrics.

6. The viterbi detector of claim 5, wherein the number of branch metrics generated by the branch metric selector is five.

7. An optical disc reproducing apparatus for an optical disc in which digital data is stored, comprising:
an optical pick-up for reading digital data stored in the optical disc and generating a high frequency signal;
an analog-to-digital converter for sampling and quantizing the high frequency signal to generate an input signal comprising n bits; and
a viterbi detector for decoding the input signal provided by the analog-to-digital converter and reproducing an eight to fourteen modulation (EFM)/EFM+ signal,
wherein the viterbi detector comprises:
a branch metric calculator comprising:
a difference metric calculator for comparing the input signal with three predetermined variables, for obtaining the differences between the input signal and the three variables, and for generating three difference metrics; and
a branch metric selector for generating a plurality of branch metrics by comparing the difference metrics with each other:
a path metric update and storage unit for receiving the plurality of branch metrics, for adding the branch metrics to values stored therein, for comparing the error content of all the possible paths with each other, and for storing a metric with respect to the path having the smallest amount of error content; and
a path memory for receiving the output signal of the path metric update and storage unit and for generating a viterbi decoded recovery signal.

8. The optical disc reproducing apparatus of claim 7, wherein the variables comprise a reference value, a high limit value obtained by adding a predetermined difference value to the reference value, and a low limit value obtained by subtracting the predetermined difference value from the reference value, and the reference value is represented by $2^{n-1}$, where n is the number of bits in the signal.

9. The optical disc reproducing apparatus of claim 8, wherein the variables are previously set and are stored in a micro controller.

10. The optical disc reproducing apparatus of claim 7, further comprising an adaptive equalizer for compensating for the distorted high frequency component of the input signal of provided by the analog-to-digital converter and for transmitting the compensated high frequency component to the viterbi detector.

11. The optical disc reproducing apparatus of claim 7, wherein the branch metric selector generates the plurality of branch metrics by comparing respective values of the difference metrics with each other, and assigns values to the plurality of branch metrics based on a result of the comparison.

12. The optical disc reproducing apparatus of claim 7, wherein the plurality of branch metrics generated by the branch metric selector are of a number that is greater than the number of difference metrics.

13. The optical disc reproducing apparatus of claim 12, wherein the number of branch metrics generated by the branch metric selector is five.

* * * * *

UNITED STATES PATENT AND TRADEMARK OFFICE
CERTIFICATE OF CORRECTION

PATENT NO. : 6,785,212 B1 Page 1 of 1
DATED : August 31, 2004
INVENTOR(S) : Tae-hyeon Sim et al.

It is certified that error appears in the above-identified patent and that said Letters Patent is hereby corrected as shown below:

Column 8,
Line 49, delete "of" before "provided by".

Signed and Sealed this

Twenty-eighth Day of December, 2004

JON W. DUDAS
*Director of the United States Patent and Trademark Office*